United States Patent
Esmaili et al.

(10) Patent No.: US 7,940,539 B2
(45) Date of Patent: May 10, 2011

(54) SINGLE-PHASE FULL BRIDGE BOOST CONVERTER SYSTEMS AND METHODS

(75) Inventors: Gholamreza Esmaili, Torrance, CA (US); Lateef A. Kajouke, San Pedro, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 545 days.

(21) Appl. No.: 12/047,142

(22) Filed: Mar. 12, 2008

(65) Prior Publication Data

US 2009/0231893 A1    Sep. 17, 2009

(51) Int. Cl.
*H02M 3/24* (2006.01)
*H02M 5/42* (2006.01)

(52) U.S. Cl. .............. 363/95; 363/97; 363/98; 363/131; 363/132; 363/133; 363/134

(58) Field of Classification Search .................... 363/95, 363/97, 98, 131, 132, 133, 134
See application file for complete search history.

(56) References Cited

U.S. PATENT DOCUMENTS

| | | | | |
|---|---|---|---|---|
| 5,329,221 | A * | 7/1994 | Schauder | 323/207 |
| 5,936,855 | A * | 8/1999 | Salmon | 363/46 |
| 6,154,379 | A * | 11/2000 | Okita | 363/40 |
| 6,882,550 | B1 * | 4/2005 | Baumgart | 363/40 |
| 7,388,766 | B2 * | 6/2008 | Baumgart et al. | 363/40 |

OTHER PUBLICATIONS

C. Schauder, et al. "Vector Analysis and Control of Advanced Static Var Compensators," IEEE Proceedings-Generation, Transmission and Distribution, 1993, pp. 299-306, vol. 140, No. 4.
P.C. Krause, et al. "Analysis of Electric Machinary and Drive Systems," Wiley-IEEE Press, 2002.
R. Zhang, et al. "A grid simulator with control of single-phase power converters in D-Q rotating frame," IEEE 33rd Annual Power Electronics Specialists Conference, Jun. 2002, pp. 1431-1436, vol. 3.
R. Esmaili, et al. "Sensorless Control of Permanent Magnet Generator in Wind Turbine Application," Industry Applications Conference, Oct. 2006. 41st IAS Annual Meeting. Conference Record of the 2006 IEEE, 2006, pp. 2070-2075, vol. 4.
R. Martinez "A High-Performance Single-Phase Rectifier with Input Power Factor Correction," IEEE Transactions on Power Electronics, Mar. 1996, pp. 311-317, vol. 11, No. 2.

* cited by examiner

*Primary Examiner* — Bao Q Vu
(74) *Attorney, Agent, or Firm* — Ingrassia Fisher & Lorenz, P.C.

(57) ABSTRACT

Single-phase full bridge boost converter systems and methods are provided. One system includes a direct-quatrature (D-Q) control system configured to generate a control voltage ($v_{con}$) including direct-phase and quadrature-phase voltage components. The system also includes a comparator configured to compare $v_{con}$ to a carrier waveform voltage, generate switching commands based on the comparison, and transmit the switching commands to a current switch. Another system includes a boost converter including multiple switches coupled to a load and an AC voltage source. The switches are configured to provide charging current to the load in response to receiving switching commands. A D-Q control system configured to receive and delay an $i_a$ value, and issue switching commands based on the $i_a$ and delayed $i_a$ value is also included. A method includes performing a D-Q conversion to generate DC current including direct-phase and quadrature-phase current components, and issuing switching commands based on the current components.

20 Claims, 6 Drawing Sheets

US 7,940,539 B2

SINGLE-PHASE FULL BRIDGE BOOST CONVERTER SYSTEMS AND METHODS

FIELD OF THE INVENTION

The present invention generally relates to AC-to-DC power converters, and more particularly relates to single-phase full bridge boost converters and methods for charging a load coupled to a single-phase AC voltage source.

BACKGROUND OF THE INVENTION

In the vector control approach for multi-phase converters, variables that vary with time (e.g., AC voltage and AC current) are transferred to the synchronous rotating direct-quatrature (D-Q) reference frame to enable the converter system to work with constant values instead of time varying values. D-Q transformations have been defined for multi-phase converter systems (e.g., two-phase and three-phase systems), but have not been defined for a single-phase system.

Accordingly, it is desirable to provide single-phase full bridge boost converter systems. It is also desirable to provide methods for charging a load coupled to a single-phase AC voltage source. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Systems are provided for issuing a switching to a single-phase full boost converter comprising a voltage sensor for detecting voltage in the DC side of the single-phase full bridge boost converter, a current sensor for detecting alternating current in the AC side of the single-phase full bridge boost converter, and a plurality of switches configured to control the alternating current. One exemplary system comprises a direct-quatrature (D-Q) control system configured to be coupled to the voltage sensor and the current sensor, and further configured to generate a control voltage ($v_{con}$) comprising a direct-phase voltage component and a quadrature-phase voltage component. The system also comprises a comparator coupled to the D-Q control system and configured to be coupled to the switch and to a waveform reference voltage ($v_{tri}$) source. In this embodiment, the comparator further configured to compare $v_{con}$ to $v_{tri}$, generate the switching command based on the comparison of $v_{con}$ and $v_{tri}$, and transmit the switching command to the switch.

Systems for charging a load are also provided. An exemplary system comprises a single-phase full bridge boost converter comprising a plurality of switches coupled to a load and an AC voltage source. The switches are configured to provide charging current to the load in response to receiving switching commands. The system also comprises a direct-quadrature (D-Q) control system coupled to the single-phase full bridge boost converter, wherein the D-Q control system is configured to receive a first AC current ($i_a$) value from the single-phase full bridge boost converter; delay the $i_a$ value to generate a second AC current ($i_b$) value; and issue the switching commands based on the $i_a$ and $i_b$ values.

Methods for charging a load in a single-phase full bridge boost converter comprising a plurality of switches coupled to the load, alternating current ($i_a$), and a voltage (v) are also provided. One exemplary method comprises the steps of performing a direct-quadrature conversion to the $i_a$ to generate a direct current including a direct-phase current ($i_d$) component and a quadrature-phase current ($i_q$) component, and issuing a switching command to the switch based on the $i_d$ component and the $i_q$ component.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
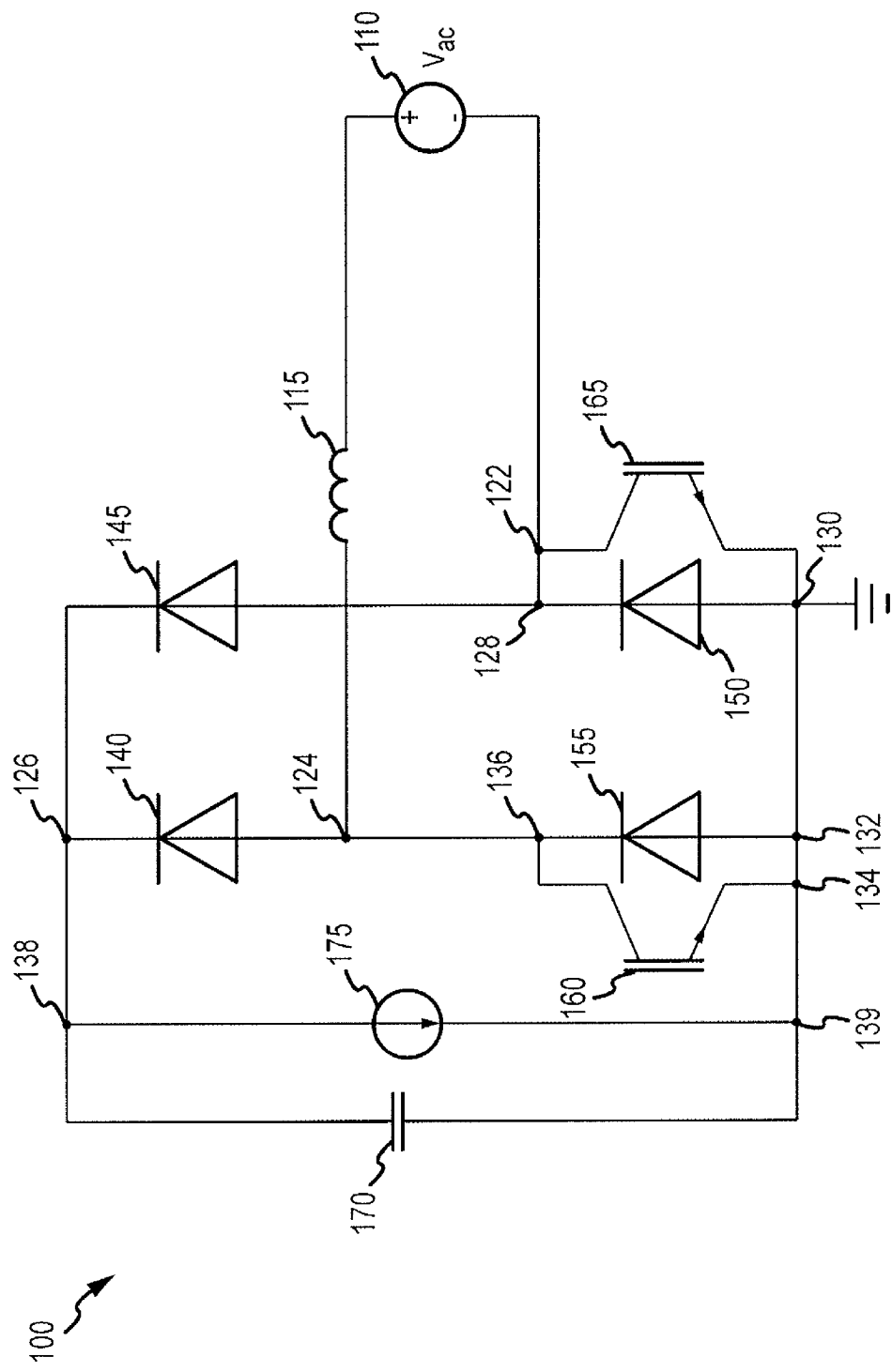
FIG. 1 is a block diagram of a prior art single-phase full bridge boost converter.

FIG. 1 is a schematic diagram of a prior art single-phase full bridge boost converter (hereinafter "converter") 100 connected to an AC voltage source 110. Converter 100 includes a node 122 connected to the negative terminal of AC voltage source 110 and an inductor 115 connected to the positive terminal of AC voltage source 110 and to a node 124.

Converter 100 also includes diodes 140, 145, 150, and 155. Diode 140 includes an anode connected to node 124 and a cathode connected to a node 126. Diode 145 includes a cathode connected to node 126 and an anode connected to a node 128, which is also connected to node 122. Diode 150 includes a cathode connected to node 128 and an anode connected to a node 130, which is also connected to a node 132 and to ground. Diode 155 includes a cathode connected to a node 136 connected to node 124, and an anode connected to node 132, which is connected to a node 134.

Also included in converter 100 are switches (e.g., semiconductor switches) 160 and 165. Switch 160 is coupled to nodes 134 and 136, which is antiparallel with diode 155. Likewise, switch 165 is coupled to nodes 122 and 130, which is antiparallel with diode 150.

Converter 100 further includes a capacitor 170 coupled in parallel with a load (e.g., a battery) 175. Specifically, the negative terminal of both capacitor 170 and load 175 are connected to a node 139 that is also connected to node 134. The positive terminal of both capacitor 170 and load 175 are connected to a node 138 that is also connected to node 126.

During operation, converter 100 uses four modes of operation to charge load 175. That is, converter 100 provides current to load 175 from AC voltage source 110 or from capacitor 170 depending on the mode of operation. Specifically, mode 1 occurs when the AC voltage from AC voltage source 110 is positive and switches 160, 165 are both OFF. When operating in mode 1, current flows through inductor 115, diode 140, capacitor 170, load 175, and returns back through diode 150.

Mode 2 occurs when the AC voltage is positive and switches 160, 165 are both ON. When operating in mode 2, current flows through switch 160 and back through diode 150. At the same time, capacitor 170 discharges and supplies current to load 175.

Mode 3 occurs when the input AC voltage is negative and switches 160, 165 are both OFF. When operating in mode 3, current flows through diode 145, capacitor 170, load 175, and back through diode 155 and inductor 115.

Mode 4 occurs when the input AC voltage is negative and switches 160, 165 are both ON. When operating in mode 4, current flows through switch 165 and back through diode 155 and inductor 115. At the same time, capacitor 170 discharges and supplies current to load 175.

Figure 2:
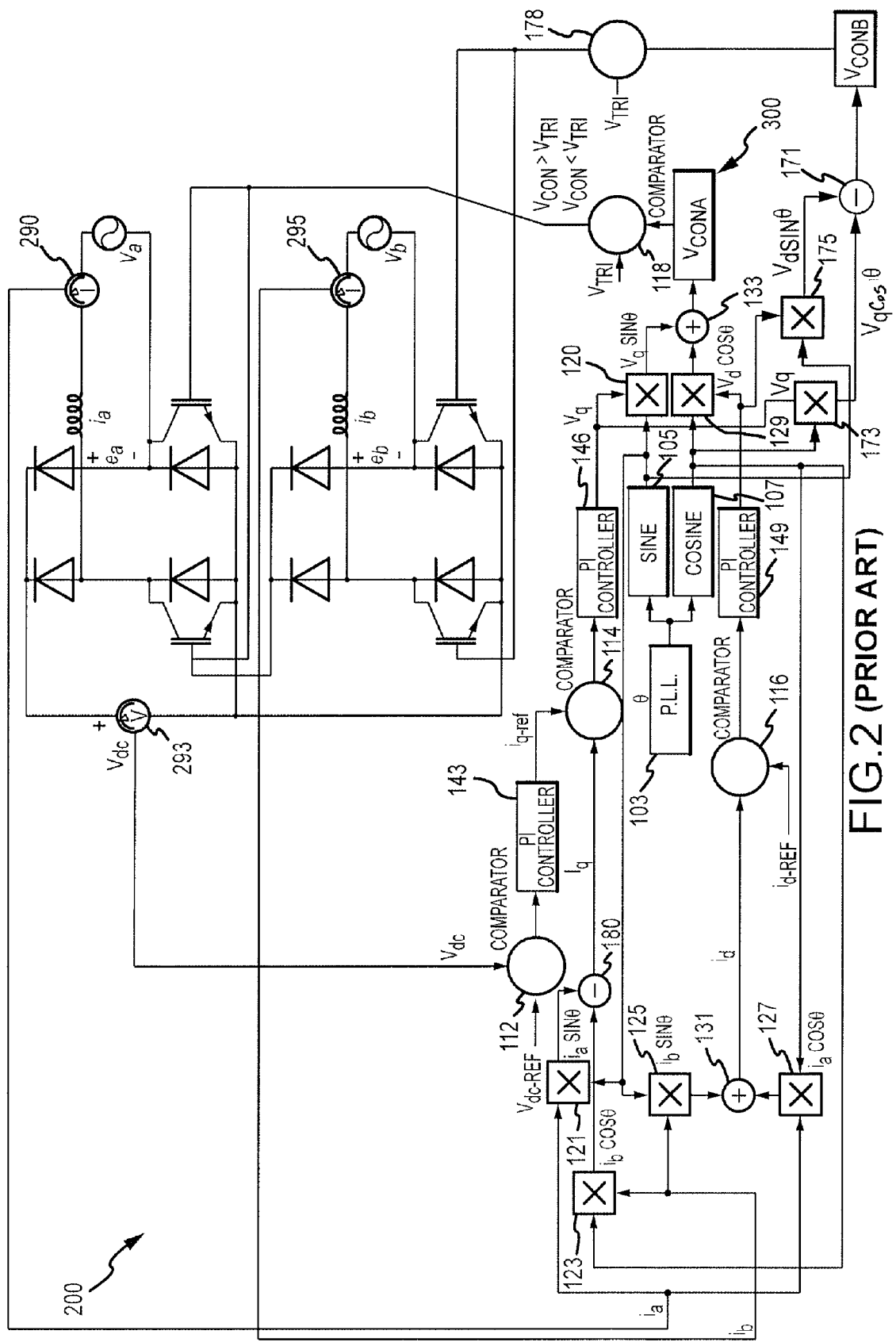
FIG. 2 is a schematic diagram of a prior art two-phase full bridge boost converter connected to a direct-quadrature (D-Q) control system.

FIG. 2 is a diagram of a prior art two-phase full bridge boost converter (hereinafter "converter") 200 connected to a D-Q control system (hereinafter "system") 300. Converter 200 includes an A-phase and a B-phase that are each similar to converter 100 discussed above with reference to FIG. 1.

System 300 is configured to issue switching commands to the plurality of switches in converter 200. That is, system 300 is based on transforming a two-phase balance system from a time-varying frame to a synchronous frame.

As illustrated in FIG. 2, system 300 includes a phase-locked loop (PLL) 103 coupled to a sine function 105 and a cosine function 107. PLL 103 may be any hardware and/or device capable of maintaining a phase angle (θ). Sine function 105 is configured to determine the sine function value of θ (i.e., the sin θ value), and cosine function 107 is configured to determine the cosine function value of θ (i.e., the cos θ value).

System 300 also includes comparators (e.g., operational amplifiers) 112, 114, 116, 118, and 178, controllers 143, 146, and 149, multipliers 120, 121, 123, 125, 127, 129, 173, and 175, adders 131 and 133, and subtractors 171 and 180. Specifically, comparator 112 is coupled to controller 143 and to a voltage sensor 293 configured to detect a DC voltage ($v_{dc}$) in converter 200, and to a DC reference voltage source (not shown) that is configured to supply a constant (or substantially constant) DC reference voltage ($v_{dc\text{-}ref}$). Comparator 112 is configured to compare the difference between $v_{dc}$ and $v_{dc\text{-}ref}$ to determine a voltage error in converter 200 and transmit the determined voltage error to controller 143.

Controller 143 may be any hardware and/or device (e.g., a PI controller) capable of generating a signal representing a reference quadrature-phase current ($i_{q\text{-}ref}$) value from the determined voltage error. In one embodiment, controller 143 is configured to receive the voltage error from comparator 112 and determine an $i_{q\text{-}ref}$ value that, if applied to converter 200, would cause $v_{dc}$ to equal $v_{dc\text{-}ref}$. Controller 143 is coupled to comparator 114 and is configured to transmit determined $i_{q\text{-}ref}$ values to comparator 114.

Comparator 114 is also coupled to subtractor 180 (discussed below), which supplies a quadrature-phase current ($i_q$) value to comparator 114. Comparator 114 is configured to compare the $i_q$ value with the $i_{q\text{-}ref}$ value to determine a quadrature-phase current error. Comparator 114 is further coupled to controller 146 and is configured to transmit the determined quadrature-phase current error to controller 146.

Controller 146 may be any hardware and/or device (e.g., a PI controller) capable of generating a quadrature-phase voltage ($v_q$) value based on the quadrature-phase current error. Controller 146 is also coupled to multipliers 120 and 173, and is configured to transmit the generated $v_q$ value to multipliers 120 and 173.

Multiplier 120, in addition to being coupled to controller 146, is coupled to sine function 105 and is configured to multiply the $v_q$ value supplied by controller 146 and the sin θ value supplied by sine function 105 to generate a $v_q$ sin θ value. Multiplier 120 is also coupled to adder 133 (discussed below) and is configured to transmit the $v_q$ sin θ value to adder 133.

Multiplier 173 is also coupled to cosine function 107 and is configured to multiply the $v_q$ value supplied by controller 146 and the cos θ value supplied by cosine function 107 to generate a $v_q$ cos θ value. Multiplier 173 is also coupled to subtractor 171 (discussed below) and is configured to transmit the $v_q$ cos θ value to subtractor 171.

Subtractor 180 is coupled to multipliers 121, 123 and is configured to receive values from multipliers 121, 123 and to subtract the value received from multiplier 123 from the value received from multiplier 121 to generate the $i_q$ value. Specifically, subtractor 180 is configured to subtract an $i_b$ cos θ value received from multiplier 123 from an $i_a$ sin θ value received from multiplier 121 to generate an ($i_a$ sin θ−$i_b$ cos θ) value, which is the $i_q$ value.

Multiplier 121 is coupled to sine function 105 and a current sensor 290 that detects AC current ($i_a$) in the a-phase of converter 200. Multiplier 121 is further configured to receive the sin θ value from sine function 105 and an $i_a$ value from current sensor 290, and multiply the sin θ value and the $i_a$ value to generate the $i_a$ sin θ value that is supplied to subtractor 180.

Multiplier 123 is coupled to cosine function 107 and a current sensor 295 that detects AC current ($i_b$) in the b-phase of converter 200. Multiplier 123 is configured to receive a cos θ value from cosine function 107 and an $i_b$ value from current sensor 295, and multiply the cos θ value and the $i_b$ value to generate the $i_b$ cos θ value that is supplied to subtractor 180.

Multiplier 125 is coupled to sine function 105 and current sensor 295, and is configured to receive the $i_b$ value from current sensor 295 and the sin θ value from sine function 105. Multiplier 125 is further configured to multiply the $i_b$ value and the sin θ value to generate an $i_b$ sin θ component. Multiplier 125 is further coupled to adder 131 and is further configured to transmit the $i_b$ sin θ component to adder 131.

Adder 131 is also coupled to multiplier 127 and is configured to receive an $i_a$ cos θ component from multiplier 127 and the $i_b$ sin θ component from multiplier 125. Multiplier 127 is coupled to and configured to receive the cos θ value from cosine function 107. Multiplier 127 is also coupled to current sensor 290 and is configured to receive the $i_a$ value from the current sensor and multiply the cos θ value and the $i_a$ value to generate an $i_a$ cos θ component.

Adder 131 is also configured to sum the $i_a$ cos θ component and the $i_b$ sin θ component to generate an ($i_a$ cos θ+$i_b$ sin θ) value, which is a direct-phase current ($i_d$) value. Adder 131 is further coupled to comparator 116 and is further configured to transmit the $i_d$ value to comparator 116.

Comparator 116 is coupled to a direct-phase reference current source (not shown) and is configured to receive a direct-phase reference current ($i_{d\text{-}ref}$) value from the direct-phase reference current source. Comparator 116 is also configured to compare the $i_d$ value supplied from adder 131 to the $i_{d\text{-}ref}$ value to determine a direct-phase current error, and to transmit the determined direct-phase current error to controller 149.

Controller 149 is coupled to comparator 116 and is configured to receive the direct-phase current error from comparator 116. Controller 149 is also configured to generate a direct-phase voltage ($v_d$) value based on the direct-phase current error. Controller 149 is also coupled to multipliers 129 and 175, and is configured to transmit the generated $v_d$ value to multipliers 129 and 175.

Multiplier 129 is also coupled to cosine function 107 and adder 133, and is configured to receive the $v_d$ value and the cos θ value from controller 149 and cosine function 107, respectively. Multiplier 129 is further configured to multiply the $v_d$ value and the cos θ value to generate a $v_d$ cos θ value and transmit the $v_d$ cos θ value to adder 133.

Adder 133 is coupled to multipliers 120, 129 and is configured to receive the $v_q$ sin θ value and the $v_d$ cos θ value from multipliers 120 and 129, respectively. Adder 133 is further configured to sum the $v_q$ sin θ value and the $v_d$ cos θ value ($v_q$ sin θ+$v_d$ cos θ) to generate an A-phase control voltage ($v_{conA}$), and to transmit $v_{conA}$ to comparator 118.

Multiplier 175 is coupled to sine function 105 and subtractor 171, and is configured to receive the $v_d$ value and the sin θ value from controller 149 and sine function 105, respectively. Multiplier 175 is further configured to multiply the $v_d$ value and the sin θ value to generate a $v_d$ sin θ value and transmit the $v_d$ sin θ value to subtractor 171.

Subtractor 171 is coupled to multipliers 175 and 173, and is configured to receive the $v_d$ sin θ value and the $v_q$ cos θ value from multipliers 175 and 173, respectively. Subtractor 171 is further configured to subtract the $v_d$ sin θ value from the $v_q$ cos θ value ($v_d$ sin θ−$v_q$ cos θ) to generate a B-phase control voltage ($v_{conB}$), and to transmit $v_{conB}$ to comparator 178.

Comparator 118 is coupled to adder 133, a triangular waveform reference voltage source (not shown), and to the plurality of switches in the A-phase of converter 200. Comparator 118 is configured to receive $v_{conA}$ from adder 133 and a triangular waveform reference voltage ($v_{tri}$) value from the triangular waveform reference voltage source, and compare $v_{conA}$ and $v_{tri}$ to generate switching commands for the plurality of switches in the A-phase based on the comparison (e.g., $v_{conA} < v_{tri}$ or $v_{conA} > v_{tri}$).

Similarly, comparator 178 is coupled to subtractor 171, the triangular waveform reference voltage source, and to the plurality of switches in the B-phase of converter 200. Comparator 178 is configured to receive $v_{conB}$ from subtractor 171 and the $v_{tri}$ value from the triangular waveform reference voltage source, and compare $v_{conB}$ and $v_{tri}$ to generate switching commands for the plurality of B-phase switches based on the comparison (e.g., $v_{conB} < v_{tri}$ or $v_{conB} > v_{tri}$). The switching commands transmitted to the A-phase and B-phase switches are such that the switches in converter 200 turn ON/OFF such that $i_a$ and $i_b$ vary in a manner to properly charge a load (not shown) connected to converter 200.

Figure 3:
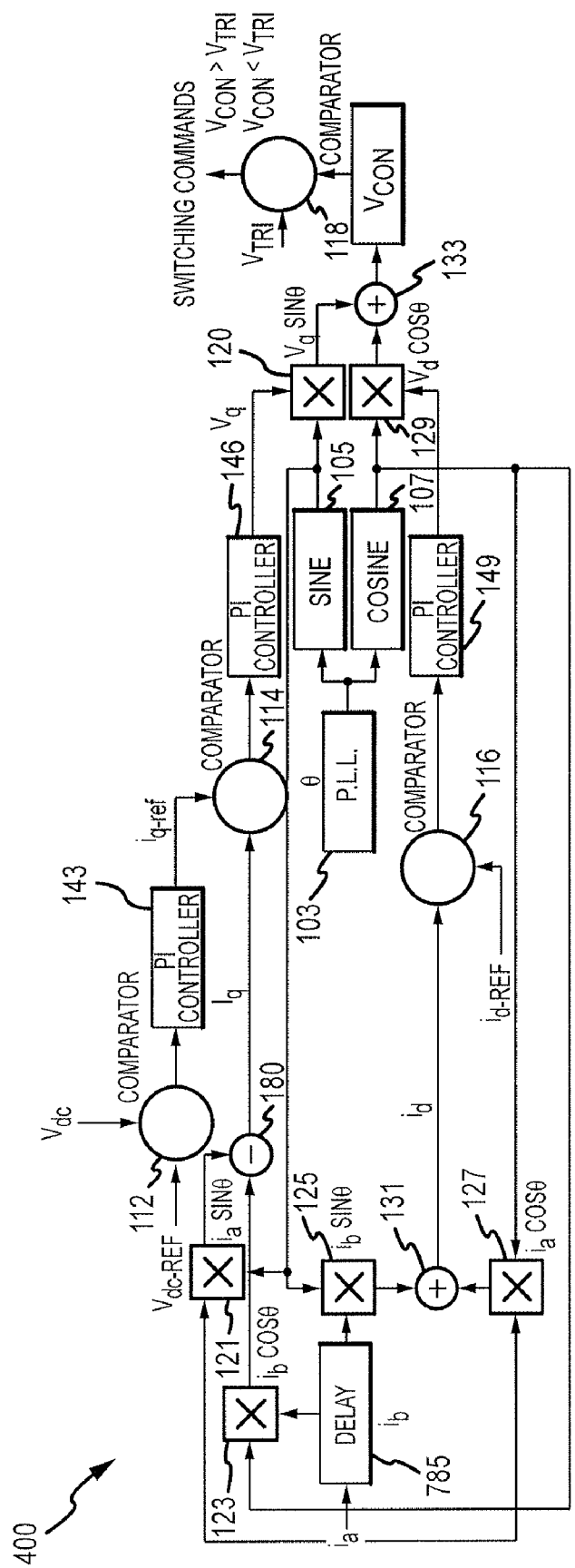
FIG. 3 is a diagram of one exemplary embodiment of a D-Q control system for use with the single-phase full bridge boost converter of FIG. 1.

FIG. 3 is a diagram of one exemplary embodiment of a D-Q control system (hereinafter "system") 400 for use with converter 100 (see FIG. 1). In the illustrated embodiment, system 400 comprises PLL 103, sine function 105, cosine function 107, comparators 112, 114, 116, and 118, controllers 143, 146, and 149, multipliers 120, 121, 127, and 129, adders 131 and 133, and subtractor 180 configured similar to system 300 discussed above with reference to FIG. 2.

System 400 also comprises a delay function 785 coupled to multipliers 123 and 125 that is capable of being coupled to a current sensor (see current sensor 591 in FIG. 7) in converter 100. Delay function 785 may be any hardware and/or device capable of receiving a detected $i_a$ value from the current sensor and applying a phase delay to the $i_a$ value to generate the $i_b$ value. In one embodiment, delay function 785 is configured to apply a 90 degree delay to $i_a$ such that $i_b$ is substantially orthogonal to the $i_a$ detected by the current sensor. Delay function 785 is also configured to transmit the $i_b$ value to multipliers 123 and 125 such that system 400 operates to provide switching commands to switches 160 and 165 in a manner similar to system 300 discussed above.

Figure 4:
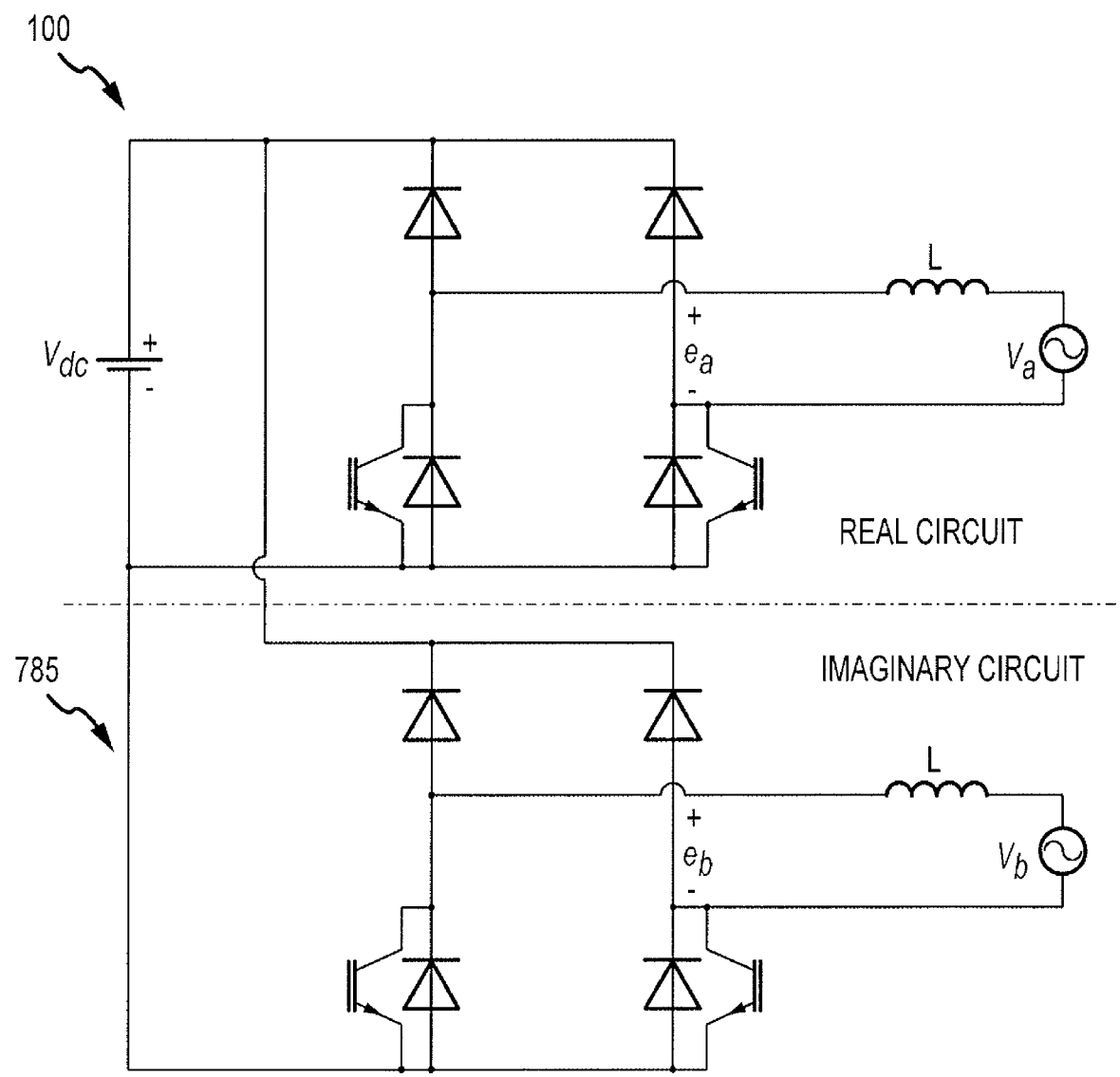
FIG. 4 is a schematic diagram representing a "real" phase and an "imaginary" phase in a two-phase balance system.

FIG. 4 is a diagram representing a "real" phase and an "imaginary" phase in a two-phase balance system, wherein the imaginary phase is orthogonal to the real phase. Here, the imaginary phase includes reference numeral 785 similar to delay function 785 discussed above with reference to FIG. 3. Though delay function 785 is not the equivalent of the imaginary phase, the $i_b$ value that delay function 785 generates (based in the $i_a$ value) and provides to system 400 is the equivalent of the $i_b$ value that system 300 receives from the b-phase of converter 200 via current sensor 295. That is, because the two-phases in converter 200 are separated by 90 degrees, by delaying (via delay function 785) the $i_a$ value in converter 100, a single-phase full bridge boost converter is capable of functioning similar to a two-phase full bridge boost converter. The following discussion presents a mathematical explanation of system 400.

Figure 5:
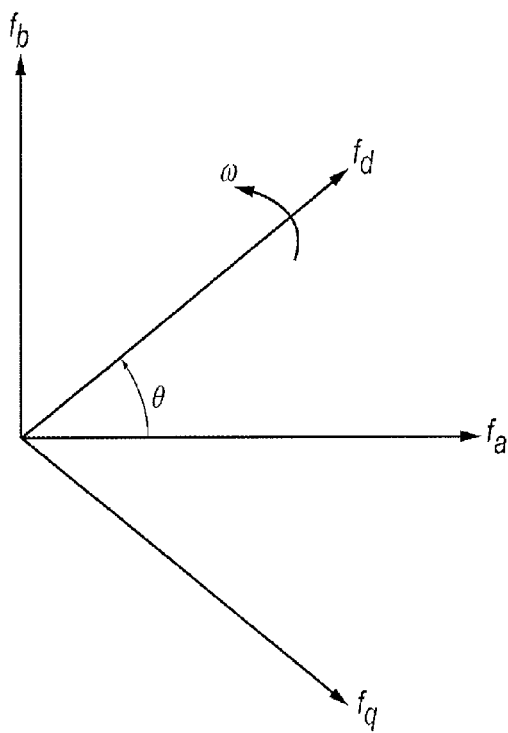
FIG. 5 is a diagram representative of the transformation between a two-phase reference frame and a D-Q reference frame.
Figure 6:
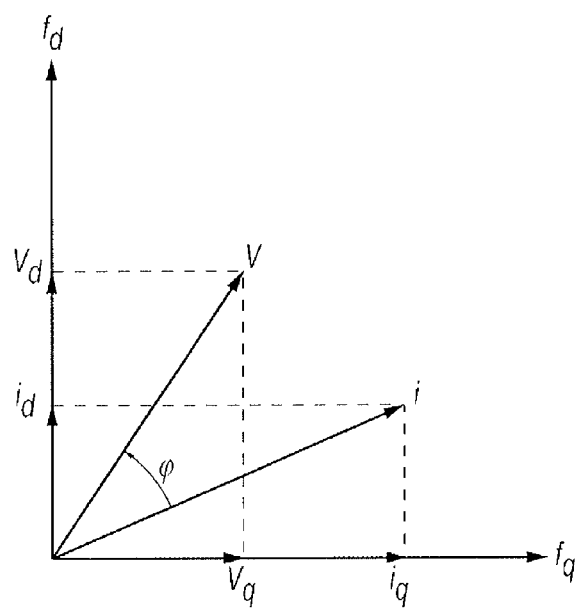
FIG. 6 is a diagram representative of the voltage and current vectors of the converter of FIG. 1 in the D-Q reference frame of FIG. 5.

FIG. 5 represents the transformation between the two-phase and D-Q phase reference frames of converter 100 and system 400, which reference frames are represented by the trigonometric relations given in equations (1) and (2). In addition, the voltage and current vectors of converter 100 in the D-Q reference frame are depicted in FIG. 6.

$$\begin{bmatrix} f_d \\ f_q \end{bmatrix} = \begin{bmatrix} \cos\theta & \sin\theta \\ \sin\theta & -\cos\theta \end{bmatrix} \begin{bmatrix} f_a \\ f_b \end{bmatrix} \quad (1)$$

$$\begin{bmatrix} f_a \\ f_b \end{bmatrix} = \begin{bmatrix} \cos\theta & \sin\theta \\ \sin\theta & -\cos\theta \end{bmatrix} \begin{bmatrix} f_d \\ f_q \end{bmatrix} \quad (2)$$

In equations (1) and (2), the variable "f" can be defined as a set of voltages or currents in converter 100. Based on FIG. 6, active and reactive power equations in the synchronous frame can be written as follows:

$$P = v_d i_d + v_q i_q \quad (3)$$

$$Q = v_d i_q - v_q i_d \quad (4)$$

The q-axis is chosen to be aligned with the phase voltage vector of converter 100 or the "real" circuit, which means that the direct-phase voltage ($v_d$) is equal to zero ($v_d=0$) and the quadrature-phase voltage ($v_q$) is equal to the magnitude of the grid voltage (v) in converter 100 ($v_q=|v|$). With these $v_d$ and $v_q$ values, the equations for the active and reactive power can be simplified as:

$$P = |v| i_q \quad (5)$$

$$Q = -|v| i_d \quad (6)$$

Since the grid voltage, |v|, is a constant, active and reactive power can be controlled by controlling the quadrature-phase current ($i_q$) and the direct-phase current ($i_d$), respectively.

Using Kirchhoff's voltage law, the voltage equations in FIG. 5 can be written as:

$$p \begin{bmatrix} i_a \\ i_b \end{bmatrix} = \frac{-R}{L} \begin{bmatrix} 1 & 0 \\ 0 & 1 \end{bmatrix} \begin{bmatrix} i_a \\ i_b \end{bmatrix} + \frac{1}{L} \begin{bmatrix} e_a - v_a \\ e_b - v_b \end{bmatrix} \quad (7)$$

Transforming the voltage equations into the synchronous reference frame using equations (1) and (2), and considering that $v_d=0$ and $v_q=|v|$, equation (7) results in:

$$p\begin{bmatrix} i_d \\ i_q \end{bmatrix} = \begin{bmatrix} -R/L & -\omega \\ \omega & -R/L \end{bmatrix}\begin{bmatrix} i_d \\ i_q \end{bmatrix} + \frac{1}{L}\begin{bmatrix} e_d \\ e_q - |v| \end{bmatrix} \quad (8)$$

To provide decoupled control of active power or $i_q$, and reactive power or $i_d$, based on equation (8), the output voltages of converter 100 in the synchronous reference frame should be chosen as:

$$e_q = L(x_1 - \omega i_d) + |v| \quad (9)$$

$$e_d = L(x_2 + \omega i_q) \quad (10)$$

By substituting equations (9) and (10) into equation (8), the decoupled equations of system 400 can be rewritten as follows:

$$p\begin{bmatrix} i_d \\ i_q \end{bmatrix} = \frac{-R}{L}\begin{bmatrix} 1 & 0 \\ 0 & 1 \end{bmatrix}\begin{bmatrix} i_d \\ i_q \end{bmatrix} + \begin{bmatrix} x_1 \\ x_2 \end{bmatrix} \quad (11)$$

As can be seen from equations (5) and (6), the active and reactive power may be controlled through $i_q$ and $i_d$, respectively. Therefore, the control rules of equations (9) and (10) can be completed by defining the current feedback loops as follows:

$$x_1 = \left(k_1 + \frac{k_2}{s}\right)(i_q^* - i_q) \quad (12)$$

$$x_2 = \left(k_1 + \frac{k_2}{s}\right)(i_d^* - i_d), \quad (13)$$

That is, system 400 is configured to issue switching commands to converter 100 consistent with equations (12) and (13).

Figure 7:
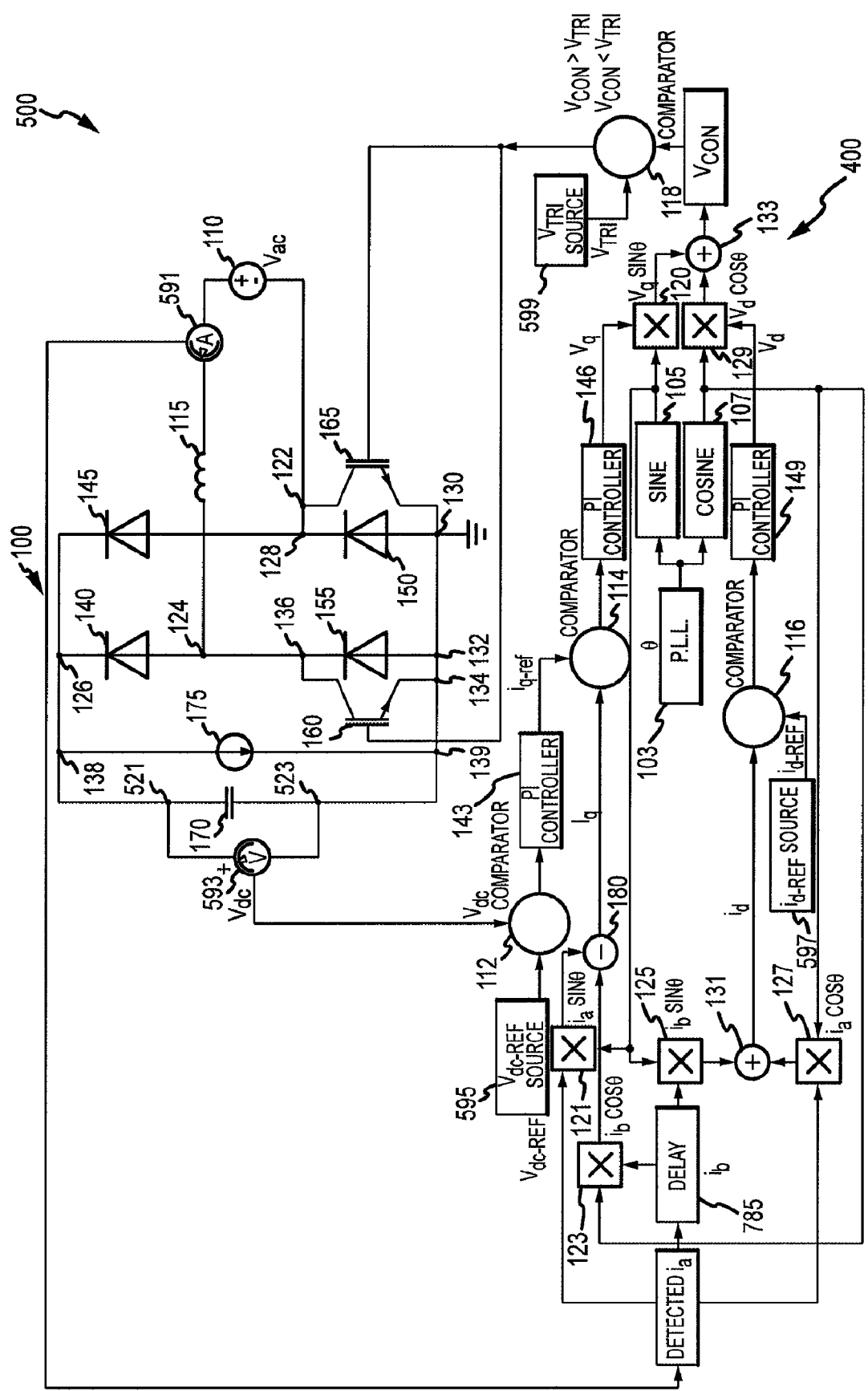
FIG. 7 is a block diagram of one exemplary embodiment of a system for charging a load comprising the single-phase full bridge boost converter of FIG. 1 and the D-Q control system of FIG. 3.

FIG. 7 is a block diagram of one exemplary embodiment of a system 500 for charging a load 175 (e.g., a battery). The various embodiments of system 500 enable active and reactive power in system 500 to be independently controlled by a V-Q transformation.

As illustrated in FIG. 7, system 500, at least in this embodiment, comprises system 400 integrated with converter 100. In doing such, system 500 comprises a current sensor 591, a voltage sensor 593, a DC reference voltage source 595, a direct-phase reference current source 597, and a triangular waveform reference voltage source 599.

Current sensor 591 is coupled between AC voltage source 110 and inductor 115 of converter 100, and is also coupled to multiplier 121, multiplier 127, and delay function 785 of system 400. Current sensor 591 is configured to detect $i_a$ in converter 100 and transmit the detected $i_a$ value to each of delay function 785, multiplier 121, and multiplier 127.

Voltage sensor 593 is coupled in parallel with capacitor 170 via nodes 521 and 523, and is coupled to comparator 112. Voltage sensor 593 is configured to detect $v_{dc}$ in converter 100 and transmit the detected $v_{dc}$ value to comparator 112.

DC reference voltage source 595 is also coupled to comparator 112. DC reference voltage source 595 is configured to provide the DC reference voltage ($v_{dc-ref}$) to comparator 112, wherein $v_{dc-ref}$ is a predetermined or desired voltage value within converter 100.

Direct-phase reference current source 597 is coupled to comparator 116 and is configured to transmit the direct-phase reference current ($i_{d-ref}$) value to comparator 116. In one embodiment, $i_{d-ref}$ includes a value of zero amps for unity power factor operation, although other embodiments may include a different value for $i_{d-ref}$.

Triangular waveform reference voltage source 599 is coupled to comparator 118 and is configured to provide the triangular waveform reference voltage ($v_{tri}$) to comparator 118. The $v_{tri}$ is a threshold voltage that, when compared to $v_{con}$, dictates whether the switching commands issued to switches 160 and 165 turn switches 160 and 165 ON or OFF.

It should be noted that when implementing system 400 with converter 100, the reference currents ($i_{d-ref}$ and $i_{q-ref}$) in system 400 should be chosen as two times the desired values. The reference currents should be doubled because system 400 does not deliver any active or reactive power to, or absorb any active or reactive power from AC voltage source 110.

During operation of system 500, comparator 112 receives $v_{dc}$ (i.e., the voltage value detected between node 521 and node 523) from voltage sensor 593 and $v_{dc-ref}$ from DC reference voltage source 595. At substantially the same time, delay function 785, multiplier 121, and multiplier 127 receive $i_a$ (i.e., the current value detected between AC voltage source 110 and inductor 115) from current sensor 591.

Comparator 112 compares $v_{dc}$ to $v_{dc-ref}$ to determine the voltage error in converter 100 and transmits the voltage error to controller 143. Controller 143 determines the $i_{q-ref}$ value needed to offset the voltage error and transmits the determined $i_{q-ref}$ value to comparator 114.

Comparator 114 also receives an $i_q$ value from subtractor 180 and compares the $i_q$ value to the $i_{q-ref}$ value to determine a quadrature-phase current error. Comparator 114 then transmits the quadrature-phase current error to controller 146.

Controller 146 receives the quadrature-phase current error and determines a $v_q$ value that would properly control switches 160, 165 based on the detected $i_a$ and $v_{dc}$ values in converter 100. Controller 146 then transmits the determined $v_q$ value to multiplier 120.

Multiplier 120 receives the $v_q$ value from controller 146 and a sin θ value from sine function 105, wherein sine function 105 receives a phase angle (θ) from PLL 103. Multiplier 120 multiplies the $v_q$ value and the sin θ value to generate a $v_q$ sin θ component of $v_{con}$, and transmits the $v_q$ sin θ component to adder 133 (described below).

As noted above, the current value $i_a$ detected by current sensor 591 is supplied to delay function 785, multiplier 121, and multiplier 125. Delay function 785 provides a 90 degree delay to $i_a$ to generate an $i_b$ value (that is the equivalent of an $i_b$ value generated by the b-phase of a two-phase full bridge boost converter). Delay function 785 then transmits the $i_b$ (i.e., the $i_a$ value+90°) value to multipliers 123 and 125. Multiplier 123 multiplies the $i_b$ value and a cos θ value received from cosine function 107 to generate an $i_b$ cos θ value, wherein cosine function 107 received the phase angle (θ) from PLL 103. Multiplier 123 then transmits the $i_b$ cos θ value to subtractor 180. Multiplier 125 multiplies the $i_b$ value and the sin θ value received from sine function 105 to generate an $i_b$ sin θ value. Multiplier 125 then transmits the $i_b$ sin θ value to adder 131.

Multiplier 121 multiplies the $i_a$ value and the sin θ value received from sine function 105 to generate an $i_a$ sin θ value. Multiplier 121 then transmits the $i_a$ sin θ value to subtractor 180 so that subtractor 180 may subtract the $i_b$ cos θ value supplied from multiplier 123 from the $i_a$ sin θ value to generate an ($i_a$ sin θ − $i_b$ cos θ) value or the $i_q$ value.

Multiplier 127 multiplies the $i_a$ value and the cos θ value received from cosine function 107 to generate an $i_a$ cos θ value. Multiplier 127 then transmits the $i_a$ cos θ value to adder 131. Adder 131 sums the $i_a$ cos θ value and the $i_b$ sin θ value supplied from multiplier 125 to generate an ($i_a$ cos θ+$i_b$ sin θ) value or $i_d$ value. Adder 131 then transmits the $i_d$ value to comparator 116.

Comparator 116 receives the $i_d$ value from adder 131 and an $i_{d\text{-}ref}$ value from direct-phase reference current source 597. Comparator 116 then compares $i_d$ to $i_{d\text{-}ref}$ and generates a direct-phase current error based on the comparison. The direct-phase current error is then transmitted to controller 149.

Controller 149 receives the direct-phase current error and determines a $v_d$ value that would properly control switches 160, 165 based on the detected $i_a$ and $v_{dc}$ values. Controller 149 then transmits the determined $v_d$ value to multiplier 129.

Multiplier 129 receives the $v_d$ value from controller 149 and the cos θ value from cosine function 107. Multiplier 129 then multiplies the $v_d$ value and the cos θ value to generate a $v_d$ cos θ component of $v_{con}$, and transmits the $v_d$ cos θ component to adder 133.

Adder 133 receives the $v_q$ sin θ component from multiplier 120 and the $v_d$ cos θ component from multiplier 129 and sums the $v_q$ sin θ component and the $v_d$ cos θ component to generate a ($v_q$ sin θ+$v_d$ cos θ) value or $v_{con}$ value. Adder 133 then transmits the $v_{con}$ value to comparator 118.

Comparator 118 receives the $v_{con}$ value from adder 133 and a $v_{tri}$ value from waveform reference voltage source 599 and compares $v_{con}$ to $v_{tri}$. Comparator 118 then transmits switching commands to switches 160, 165 based on the comparison of $v_{con}$ and $v_{tri}$. For example, if $v_{con}$ is greater than $v_{tri}$ (i.e., $v_{con} > v_{tri}$), the switching commands turn switches 160, 165 ON, whereas if $v_{con}$ is less than $v_{tri}$ (i.e., $v_{con} < v_{tri}$), the switching commands turn switches 160 and 165 OFF so that converter 100 operates similar to the discussion above with reference to FIG. 1.

Notably, setting $i_d$-ref to zero volts yields unity power factor operation in system 500. Furthermore, $i_d$-ref set to zero volts yields a low total harmonic distortion and exceptional "zero crossing" characteristics.

As one skilled in the art will recognize, system 400 may be implemented using computing hardware (and software), a computing device, and/or a computing system. That is, various embodiments of the invention contemplate that system 400 may be implemented via a processor, and specifically, a digital signal processor.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A system for issuing a switching command to a single-phase full boost converter comprising a voltage sensor for detecting a DC voltage ($v_{dc}$), a current sensor for detecting an alternating current ($i_a$), and a switch configured to control the $i_a$, the system comprising:

a direct-quadrature (D-Q) control system configured to be coupled to the voltage sensor and the current sensor, and further configured to:

apply a phase delay to the alternating current ($i_a$) detected by the current sensor to generate a delay current ($i_b$); and generate a control voltage ($v_{con}$) based on the alternating current ($i_a$) detected by the current sensor and the delay current ($i_b$), the control voltage ($v_{con}$) comprising a direct-phase voltage component and a quadrature-phase voltage component; and a first comparator coupled to the D-Q control system and configured to be coupled to the switch and to a waveform reference voltage ($v_{tri}$) source, the first comparator further configured to:

compare $v_{con}$ to $v_{tri}$, generate the switching command based on the comparison of $v_{con}$ and $v_{tri}$, and transmit the switching command to the switch.

2. The system of claim 1, wherein the D-Q control system comprises:

a first portion configured to be coupled to the voltage sensor and the current sensor, and further configured to generate the quadrature-phase voltage component based on the $v_{dc}$ detected by the voltage sensor, the alternating current ($i_a$) detected by the current sensor, and the delay current ($i_b$);

a second portion configured to be coupled to the voltage sensor and the current sensor, and further configured to generate the direct-phase voltage component based on the alternating current ($i_a$) detected by the current sensor and the delay current ($i_b$); and a first adder coupled to the first portion, the second portion and the first comparator, the first adder configured to sum the quadrature-phase voltage component and the direct-phase voltage component to generate the $v_{con}$.

3. The system of claim 1, wherein the D-Q control system further comprises a delay function coupled to the current sensor, the delay function further configured to apply a 90 degree delay to the alternating current ($i_a$) detected by the current sensor to generate the delay current ($i_b$).

4. The system of claim 3, wherein the D-Q control system further comprises:

a phase-locked loop (PLL) configured to determine a phase angle (θ);

a first portion configured to be coupled to the voltage sensor and the current sensor, and further configured to generate the quadrature-phase voltage component based on the DC voltage ($v_{dc}$) detected by the voltage sensor, the alternating current ($i_a$) detected by the current sensor, and the delay current ($i_b$);

a second portion configured to be coupled to the voltage sensor and the current sensor, and further configured to generate the direct-phase voltage component based on the alternating current ($i_a$) detected by the current sensor and the delay current ($i_b$);

a first adder coupled to the first portion, the second portion and the first comparator, the first adder configured to sum the quadrature-phase voltage component and the direct-phase voltage component to generate the $v_{con}$;

a sine function coupled to the PLL, the first portion, and the second portion, the PLL configured to provide a sin θ value to the first portion and the second portion; and a cosine function coupled to the PLL, the first portion, and the second portion, and configured to provide a cos θ value to the first portion and the second portion.

5. The system of claim 4, wherein the first portion comprises:
- a first multiplier coupled to the cosine function and the delay function, the first multiplier further configured to multiply the cos θ value and the $i_b$ to generate an $i_b$ cos θ component;
- a second multiplier coupled to the sine function and configured to be coupled to the current sensor, the second multiplier configured to multiply the sin θ value and the detected $i_a$ to generate an $i_a$ sin θ component; and
- a subtractor coupled to the first multiplier and the second multiplier, the subtractor configured to subtract the $i_a$ sin θ component from the $i_b$ cos θ component to generate a quadrature-phase current ($i_q$) value.

6. The system of claim 5, wherein the first portion further comprises:
- a second comparator configured to be coupled to a DC reference voltage ($v_{dc\text{-}ref}$) source and the voltage sensor, the second comparator configured to compare $v_{dc\text{-}ref}$ to $v_{dc}$ to determine a voltage error;
- a first controller coupled to the second comparator and configured to determine a reference quadrature-phase current ($i_{q\text{-}ref}$) value to offset the voltage error;
- a third comparator coupled to the first controller and the subtractor, the third comparator configured to compare the $i_q$ value to the determined $i_{q\text{-}ref}$ value to determine a quadrature-phase current error;
- a second controller coupled to the third comparator and configured to determine a quadrature-phase voltage ($v_q$) value to offset the determined quadrature-phase current error; and
- a third multiplier coupled to the second controller, the sine function, and the first adder, the third multiplier configured to multiply the determined $v_q$ value and the sin θ value to generate the quadrature-phase voltage component.

7. The system of claim 6, wherein the second portion comprises:
- a fourth multiplier coupled to the cosine function and configured to be coupled to the current sensor, the fourth multiplier further configured to multiply the cos θ value and the detected $i_a$ to generate an $i_a$ cos θ component;
- a fifth multiplier coupled to the sine function and the delay function, and configured to multiply the sin θ value and the $i_b$ to generate an $i_b$ sin θ component; and
- a second adder coupled to the fourth multiplier and the fifth multiplier, the second adder configured to sum the $i_a$ cos θ component to the $i_b$ sin θ component to generate a direct-phase current ($i_d$) value.

8. The system of claim 7, wherein the second portion further comprises:
- a fourth comparator coupled to the second adder and configured to be coupled to a direct-phase reference current ($i_{d\text{-}ref}$) source, the third comparator further configured to compare the $i_d$ value to the $i_{d\text{-}ref}$ to determine a direct-phase current error;
- a third controller coupled to the fourth comparator and configured to determine a direct-phase voltage ($v_d$) to offset the determined direct-phase current error; and
- a sixth multiplier coupled to the third controller, the cosine function, and the first adder, the sixth multiplier configured to multiply the $v_d$ and the cos θ value to generate the direct-phase voltage component.

9. The system of claim 8, wherein $i_{d\text{-}ref}$ has a value of zero.

10. A system for charging a load using an AC voltage source, comprising:
- a single-phase full bridge boost converter comprising a plurality of switches coupled to the load and the AC voltage source, the plurality of switches configured to provide charging current to the load in response to receiving switching commands; and
- a direct-quadrature (D-Q) control system coupled to the single-phase full bridge boost converter, wherein the D-Q control system is configured to:
  - receive a first AC current ($i_a$) value from the single-phase full bridge boost converter;
  - delay the $i_a$ value to generate a second AC current ($i_b$) value; and
  - issue the switching commands based on the $i_a$ and $i_b$ values.

11. The system of claim 10, wherein the D-Q control system is further configured to issue the switching commands based on a DC voltage ($v_{dc}$) received from the full bridge boost converter.

12. The system of claim 11, wherein the D-Q control system is further configured to:
- determine a quadrature-phase current value based on the $v_{dc}$, the $i_a$, and a delay current of the $i_a$;
- determine a quadrature-phase voltage value based on the $i_q$ value;
- determine a direct-phase current value based on the $i_a$ and the $i_b$;
- determine a direct-phase voltage value based on the $i_d$ value; and
- generate the switching commands based on the determined quadrature-phase voltage value and the determined direct-phase voltage value.

13. A method for charging a load in a single-phase full boost converter including a current switch coupled to the load, alternating current ($i_a$), and a DC voltage ($v_{dc}$), the method comprising the steps of:
- delaying a detected value of the alternating current ($i_a$) to generate a delayed current ($i_b$) value;
- performing a direct-quadrature conversion to the detected value of the alternating current ($i_a$) and the delayed current ($i_b$) value to generate a direct current including a direct-phase current ($i_d$) component and a quadrature-phase current ($i_q$) component; and
- issuing a switching command to the switch based on the $i_d$ component and the $i_q$ component.

14. The method of claim 13, wherein the performing step comprises the steps of:
- comparing the $v_{dc}$ to a DC reference voltage ($v_{dc\text{-}ref}$) to determine a voltage error;
- determining a quadrature-phase reference current ($i_{q\text{-}ref}$) value to offset the voltage error;
- determining an $i_q$ value for the single-phase full boost converter;
- comparing the $i_{q\text{-}ref}$ value to the determined $i_q$ value;
- determining a quadrature-phase voltage ($v_q$) value based on the comparison of $i_{q\text{-}ref}$ and $i_q$; and
- multiplying the $v_q$ value by a sine function of a phase angle (sin θ) to generate a first portion of the switching command.

15. The method of claim 14, wherein:
- delaying the detected value of the alternating current ($i_a$) to generate the delayed current ($i_b$) value comprises applying a 90 degree phase delay to the detected value of the alternating current ($i_a$) to generate the delayed current ($i_b$) value; and
- the determining the $i_q$ value step comprises the steps of:
  - multiplying the $i_a$ value by the sin θ to generate an $i_a$ sin θ value;

multiplying the $i_b$ value by a cosine function of the phase angle (cos θ) to generate an $i_b$ cos θ value; and subtracting the $i_b$ cos θ value from the $i_a$ sin θ value ($i_a$ sin θ−$i_b$ cos θ) to generate the $i_q$ value.

16. The method of claim 15, wherein the performing step further comprises the steps of:

determining a direct-phase current ($i_d$) value for the single-phase full boost converter;

comparing the determined $i_d$ value to a reference direct-phase current ($i_{d-ref}$) value;

determining a direct-phase voltage ($v_d$) value based on the comparison of the determined $i_d$ value and the $i_{d-ref}$ value; and multiplying the $v_d$ value by a cosine function of the phase angle (cos θ) to generate a second portion of the switching command.

17. The method of claim 16, further comprising the steps of:

summing the first portion and the second portion to generate a voltage value ($v_q$ sin θ + $v_d$ cos θ) in a control voltage ($v_{con}$);

comparing $v_{con}$ to a waveform reference voltage ($v_{tri}$);

determining the switching command based on the comparison of $v_{con}$ and $v_{tri}$.

18. The method of claim 17, further comprising the step of operating a switch coupled to a current source within the single-phase full boost converter based on the switching command.

19. The method of claim 16, wherein the determining the $i_d$ value step comprises the steps of:

multiplying the $i_a$ value by the cos θ to generate an $i_a$ cos θ value;

multiplying the $i_b$ value by the sin θ to generate an $i_b$ sin θ value; and summing the $i_a$ cos θ value and the $i_b$ sin θ value ($i_a$ cos θ + $i_b$ sin θ) to generate the $i_d$ value.

20. The method of claim 19, wherein the comparing the $i_d$ value to the $i_{d-ref}$ value comprises the step of comparing the $i_d$ value to a zero value.

* * * * *